(12) United States Patent
Winkler

(10) Patent No.: US 11,975,921 B2
(45) Date of Patent: May 7, 2024

(54) FLEXIBLE AND COMPACT ORDER PICKING SYSTEM

(71) Applicant: WITRON LOGISTIK + INFORMATIK GMBH, Parkstein (DE)

(72) Inventor: Walter Winkler, Parkstein (DE)

(73) Assignee: WITRON LOGISTIK + INFORMATIK GMBH, Parkstein (DE)

( * ) Notice: Subject to any disclaimer, the term of this patent is extended or adjusted under 35 U.S.C. 154(b) by 864 days.

(21) Appl. No.: 16/347,047

(22) PCT Filed: Nov. 3, 2017

(86) PCT No.: PCT/DE2017/100935
§ 371 (c)(1),
(2) Date: May 2, 2019

(87) PCT Pub. No.: WO2018/082749
PCT Pub. Date: May 11, 2018

(65) Prior Publication Data
US 2020/0071077 A1    Mar. 5, 2020

(30) Foreign Application Priority Data
Nov. 4, 2016    (DE) ............... 10 2016 121 130.3

(51) Int. Cl.
*B65G 1/137*    (2006.01)
*B65G 1/04*    (2006.01)
(Continued)

(52) U.S. Cl.
CPC ......... *B65G 1/1376* (2013.01); *B65G 1/0478* (2013.01); *B65G 1/06* (2013.01);
(Continued)

(58) Field of Classification Search
CPC ...... B65G 1/1376; B65G 1/0478; B65G 1/06; B65G 15/00; B65G 2201/02; B65G 2209/02
See application file for complete search history.

(56) References Cited

U.S. PATENT DOCUMENTS 3,978,995 A * 9/1976 Zollinger ............. B65G 1/0414
414/279
4,395,180 A * 7/1983 Magnotte .................. B66C 7/14
104/127
(Continued)

FOREIGN PATENT DOCUMENTS

DE    20 2004 008 679 U1    10/2004
DE    10 2014 109 863 A1    1/2016
(Continued)

OTHER PUBLICATIONS

International Search Report issued in Application No. PCT/DE2017/100935 dated Feb. 15, 2018 (8 pages).
(Continued)

*Primary Examiner* — Kyle O Logan
(74) *Attorney, Agent, or Firm* — Abel Schillinger, LLP

(57) ABSTRACT

A method and installation for picking items from storage units into one or more outbound units. The installation has a small parts store in which the storage units are stored, and a pick area, in which storage units from the parts store are presented at several pickup points. Assigned to the pick area is a conveyor track via which the outbound units can be moved in or out of the pick area, such that items can be picked from the storage units disposed in the pickup points and into the outbound units. The installation has a pick location, at which one or more receiving locations for outbound units and a conveyor device for storage units from the parts store are disposed such that items can be picked
(Continued)

from the storage units delivered on the conveyor device and into the outbound units disposed at the receiving locations.

20 Claims, 8 Drawing Sheets

(51) Int. Cl.
    *B65G 1/06*    (2006.01)
    *B65G 15/00*    (2006.01)

(52) U.S. Cl.
    CPC .......... *B65G 15/00* (2013.01); *B65G 2201/02* (2013.01); *B65G 2209/02* (2013.01)

(56) References Cited

U.S. PATENT DOCUMENTS

| | | | |
|---|---|---|---|
| 5,024,575 A * | 6/1991 | Anderson | B65G 47/90 294/2 |
| 2007/0128015 A1 * | 6/2007 | Imai | H01L 21/68707 414/737 |
| 2013/0006412 A1 * | 1/2013 | Lindblom | B65G 1/0492 700/218 |
| 2013/0223959 A1 | 8/2013 | Koholka | |
| 2016/0340122 A1 * | 11/2016 | Lindblom | B65G 1/0414 |

FOREIGN PATENT DOCUMENTS

| | | |
|---|---|---|
| EP | 0 943 561 A2 | 9/1999 |
| WO | 2012/069327 A1 | 5/2012 |
| WO | 2012/103566 A1 | 8/2012 |

OTHER PUBLICATIONS

Written Opinion issued in Application No. PCT/DE2017/100935 dated Feb. 15, 2018 (9 pages).

* cited by examiner

FLEXIBLE AND COMPACT ORDER PICKING SYSTEM

BACKGROUND OF THE INVENTION

Field of the Invention

The present invention concerns a method and an installation for picking items.

Prior Art

In many areas of industry and commerce, identical items delivered in large containers must be picked so that they can be presented in smaller packaging units together with other items at certain locations. This can be the case, e.g., when workplaces are supplied with components to be assembled in the field of industrial assembly of products or when retail outlets are supplied with items from a central warehouse or when items are shipped to end customers in online commerce.

However, the picking tasks can vary extensively, e.g. with regard to the total number of items to be picked and the different types of items, the frequency of picking overall and the individual items, and so on. Accordingly, a plurality of different order picking methods and devices for picking items are already known from the prior art. The challenge posed by all the different kinds of picking tasks consists in the fact that, for the purpose of achieving a high pick rate combined with efficient execution of picking under the imposed requirements and boundary conditions, the most suitable picking method must be found and the appropriate equipment deployed. However, since picking orders are usually not always identical, but can vary extensively, e.g. according to the sale and variety of items offered in retail outlets, there is a need to offer flexible and compact picking systems which can respond flexibly to different picking requirements and which facilitate efficient deployment of picking equipment as well as warehouse and conveyor systems in an order picking system.

DISCLOSURE OF THE INVENTION

Object of the Invention

It is therefore the object of the present invention to provide a method and an installation for picking items, in which the installation has a compact design for the purpose of achieving efficient, inexpensive picking and enables efficient picking with flexible alignment to different picking needs.

Technical Solution

For the purpose of achieving this object, an installation having the features of claim 1 and a method having the features of claim 12 are proposed. Advantageous embodiments are the object of the dependent claims.

The invention provides for a method and an installation in which two different picking principles are combined with a view to switching flexibly between the different picking types in response to the picking requirements. At the same time, the different picking types are combined in a compact installation that has a small footprint and short transport distances for the items, thus enabling efficient picking.

The technical solution is based on an automated small parts store (SPS), in which the items to be picked are stored in storage units, preferably storage units which have been specifically made up for the SPS and are kept for picking. Accordingly, storage units containing single-type items for picking as per picking orders can normally be stored in the small parts store (SPS).

By storage units is meant all forms of containers, such as cartons, crates and the like, as well as trays, pallets or other devices that can accommodate items.

The items kept in the SPS can be automatically stored in and retrieved from the SPS by means of warehouse handling machines in order to be available for order picking.

For depositing the items in storage units into the SPS and for order picking as a whole, a control unit in the form of a data processing device is provided, with which picking orders can be logged and automatically processed. Accordingly, when a picking order is being processed, the control unit determines how the ordered items which have to be picked must be composed to form a shipping unit for shipping the items and which items must be retrieved from the SPS for the purpose of picking.

In line with the size of the picking order, a shipping unit may contain one or more outbound units containing the picked items, whereby outbound units in turn are understood to mean all forms of containers such as cartons, crates and the like as well as trays, pallets or other devices that can accommodate items.

For picking, provided at and/or in the small parts store are at least two different types of picking equipment, with which at least two different types of picking, i.e. the transfer of a certain number and type of items from the storage units into the outbound units, can be performed.

On one hand, for the first type of picking, provision is made for at least one, preferably several, stationary pick locations, to which both the storage units containing the stored items and the outbound units for accommodating the picked items are delivered, so that a picker working at the stationary pick location can transfer the required number of items from the delivered storage units into the outbound unit as per the picking order. For the purpose of transferring the various items into the outbound unit, the required different storage units containing the different items are delivered one by one to the stationary pick location, for which purpose storage unit handling equipment can be provided, which can transport the storage units which have been retrieved from the SPS by the warehouse handling machines to the stationary pick location. Which of the storage units containing which items is delivered at which time to the stationary pick location so that a certain number of items can be transferred into one of the delivered outbound units is determined by the control unit, which controls the installation as per the picking order such that the required storage units containing the required items are delivered accurately to the at least one stationary pick location when the outbound unit into which the items are to be picked is also present at the corresponding stationary pick location. Such a picking method, in which the items are delivered to the picker, is referred to below as the "first sub-system (ESS)".

In combination with the small parts store, which can preferably be designed as a high-rack warehouse, the corresponding stationary pick locations for the ESS can be disposed at the end faces of rack aisles, in which warehouse handling machines or rack vehicles retrieve the necessary storage units containing the items to be picked, transfer them, if necessary, to storage unit handling equipment for the purpose of transporting the storage units to the stationary pick location and, after picking has been completed, store the storage units containing the remaining items back in the SPS.

Accordingly, the transport distances can be kept short.

In addition, provision can be made between the SPS containing the storage locations and the warehouse handling machines and the stationary pick locations of the ESS for a so-called sequence buffer in order that timely, precision presentation of the storage units at the stationary pick location may be facilitated.

Transporting of the outbound units, into which picking has taken place, away from the stationary pick locations of the ESS can proceed via a takeaway conveyor to a stacking and/or packing station for shipping the outbound units or via an interim storage conveyor into the SPS for the purpose of interim storage or buffering of the fully or partially picked outbound units in the SPS or via a conveyor track which already forms part of a further type of picking in the inventive installation.

The at least second type of picking, which in the present invention is deployed in conjunction with the same SPS as the ESS, uses at least one pick area, preferably several pick areas, so-called pick stations. In this type of picking, the outbound units into which orders are picked are presented in the pick areas, the so-called pick stations, where a picker can remove the desired items from various storage units presented in pickup points and transfer them into the outbound unit. This type of order picking is therefore based on the picker-to-item system, because the order picker has to fetch the items from the pickup points of the storage units at the pick stations and has to pick them into the presented outbound units. In the following, this picking principle is also referred to as the second subsystem (ZSS).

In ZSS picking, the outbound unit can be moved along a conveyor track past the presentation areas of the at least one pick area or at least be transported on the conveyor track away from the pick area, more precisely either to a further pick station or pick area, where further items are picked into the outbound unit, or to a pick location of the ESS, where further items can also be picked into the outbound unit as per the picking order, or, for the purpose of interim storage, into the SPS until further picking can take place or further outbound units of the shipping unit of the picking order are fully picked. Alternatively, the outbound unit can also be transported on the conveyor track direct to a takeaway conveyor, with which the outbound unit is transported to a stacking and/or packing station, where the outbound unit may possibly be stacked and/or packed with other outbound units to form a shipping unit. Of course, the converse route from ESS picking to ZSS picking is also possible.

In contrast to the ESS, which deploys the item-to-picker system, order picking in the pick areas does not involve stationary pick locations, as the picker must fetch the items at the various pickup points of the storage units and, in so doing, take the outbound unit, into which picking is performed, along the conveyor track or follow the outbound unit being automatically transported on the conveyor track. However, the pick area and thus the movement area of a picker can be kept very small by a suitable arrangement of the pickup points and judicious choice of the items presented there in the storage units, so that in the case of short pick areas, picking into a stationary outbound unit is also conceivable.

In addition, at the pick stations too, the items to be picked with the storage units are automatically presented from the SPS, but in several pickup points at once. Presentation of the storage units in the pickup points can be either static or dynamic. Where the storage units are presented statically, the items are continuously presented in presentation areas and, when a storage unit is emptied, a new storage unit containing the same items is presented in the same pickup point. In dynamic presentation, the items are not presented permanently in the pickup points, but intermittently as required.

In the inventive installation, the so-called pick stations of the ZSS can be disposed along one or more rows of racks in the SPS, whereby the pickup points for the storage units can be provided in the lower area of a rack. At the side of a corresponding rack opposite the pick station or the pickup points of the storage units provision can be made for a rack vehicle which can remove the storage units from the storage locations of the SPS and present them in the pickup points of the pick station. Delivery of the outbound units to the pick stations can take place via the conveyor track, which transports the outbound units along or within one or more racks and which connects several pick stations to each other as well as to the pick locations of the ESS.

Especially in the pick areas, the conveyor track can have several, especially two, transport tracks parallel with each other, such that outbound units on one conveyor track can be transported past the pick area while, on the parallel conveyor track, those outbound units are moved which are in the pick area and into which picking is currently taking place.

For the purposes of this description of the present invention, a transport track is defined as any apparatus that can be used to convey or transport outbound units, such as conveyor belts, roller conveyors or other horizontal conveying devices, as well as devices that can facilitate vertical transport movement of the outbound units.

In addition, the conveyor track for transporting outbound units can be set up not just for delivering outbound units to the pick stations, whereby different pick stations can be connected via the conveyor line. Rather, as mentioned above, the conveyor track can also be configured such that the conveyor track connects pick stations and pick locations in order that an outbound unit may be picked not only at different pick stations, but also at pick locations. In addition, the conveyor track for outbound units can be further configured such that it can interact with an interim storage conveyor, such that outbound units can be transported to storage and/or retrieval points for the SPS, where the outbound units can be transferred to warehouse handling machines for the purpose of storage/or retrieval of fully or partially picked outbound units, such that outbound units too can be stored in the SPS, such that, when several outbound units for an order are picked in parallel, the corresponding outbound units can be temporarily stored or buffered in the small parts store and, only when the order has been completed, all the outbound units containing the picked items are retrieved from the SPS again and composed to form a shipping unit. This process, also known as order consolidation, can therefore also be integrated into the same SPS that is used for ESS and ZSS. This makes the installation even more compact.

In addition, a conveyor track for the outbound units, which connects different handling points for outbound units in the installation, in particular different conveyor lines along various racks of the SPS and thus different pick stations in various rack aisles, enables an outbound unit to be easily presented at different picker workstations, namely various pick areas and/or various pick locations.

Another advantage of a corresponding conveyor system for outbound units is that the two different picking systems, namely ZSS and ESS, can be combined with each other, such that outbound units can first be presented in the ESS at a stationary pick location and then be presented in pick stations for the purpose of picking in the ZSS and vice versa, whereby the picking systems may also be used alone. As the entire system is controlled by an automated control unit with a data processing system, the various types of picking system can be flexibly combined with one another and, to an extent depending on the picking effort or picking requirement for the different items, in the different picking systems can be made available, whereby all items can be presented from a single SPS. In particular, items with different picking frequencies, so-called fast movers, which are picked frequently, and slow movers, which are picked less frequently, can be picked in the appropriate form to enable efficient picking at a high pick rate.

Accordingly, to an extent depending on the picking load, picking tasks can be distributed between the pick areas and pick locations and/or between several pick areas or pick locations. The distribution of picking tasks between the pick areas of the ZSS subsystem and the pick locations of the ESS subsystem as well as within the pick areas of the ZSS subsystem or between the pick locations of the ZSS subsystem can be automated, in particular by the installation's control unit, wherein preference is given to parameters from the group comprising an actual and/or expected average picking speed per order, the frequency of required movements of storage units and/or outbound units, the picking frequency of a particular item, the determined pick rate of pickers and the number of pickers required. In this connection, future picking can be simulated on the basis of the pick rate achieved so far for different distributions of the picking tasks between the ESS and ZSS subsystems and/or for various pick areas or pick locations and the pickers employed there and can be optimized by comparing the various expected pick rates or the expected picking effort relative to, e.g., the required movement of storage units and outbound units.

In addition, the use of the SPS for interim storage of partially or fully picked outbound units facilitates simple order consolidation and optimum utilisation of the overall system in combination with a very compact design. In order consolidation, in which the SPS is partly used as a so-called order consolidation buffer (OCB), several outbound units belonging to an order can be temporarily stored or buffered until the entire order or all outbound units of the order are ready for shipping. All storage locations in the SPS can therefore be flexibly filled with storage units for the subsystems (ESS, ZSS) and also with outbound units for order consolidation.

Furthermore, it is also possible with the installation presented here to perform the converse process and to sort returns, i.e. items that come back from the customer, for example, back into the warehouse inventory. For a returns process of this type, the storage units can be transferred to one or more pickup points and/or one or more pick locations such that returns which have been presented can be transferred back into the storage units.

In particular, the following advantages result from the inventive installation and method:

Integration of two picking techniques, ZSS and ESS, as well as order consolidation buffer in one system. ZSS enables items with a small number of different types of items to be picked, which preferably have a high picking frequency and can also be described as "fast movers". ESS enables items that have a high number of different types of items to be picked effectively, whereby in particular items with a low picking frequency, also known as "slow movers", can be picked.

Flexible Picking of Items in Both Subsystems

The items to be picked can be presented flexibly in the ZSS or ESS subsystem for picking, more precisely as a function of the variably changing picking frequency of the corresponding items themselves or relative to the other items presented for picking. This allows the performance of the entire installation to be optimised at any time, e.g. in the event of seasonal fluctuations or fluctuations in demand for certain items over the course of a week or a day.

Compact Inventory Management in a Single Container Warehouse (SPS)

The items are amenable to both picking techniques, i.e. at different picker workstations, whereby ESS has a stationary picker workstation with sequenced feeding of the individual storage units, while ZSS uses individual pick stations with static and dynamic presentation of the storage units in the pickup points. Presentation in accordance with the ABC structure, i.e. the picking frequency, and the facilitation of simultaneous multiple access to the same types of items, greatly reduces the pick area and thus the pick path for a picker. As a result, a pick rate comparable to that of the ESS item-to-picker system is achieved.

System Redundancy, as no Separate Systems

The storage and retrieval machines of the SPS can be used flexibly for the respective tasks. Additional redundancy can be achieved through the use of two or more storage and retrieval machines per rack aisle, so that, even if one storage and retrieval machine should fail, the corresponding aisle with adjacent racks and storage locations can be used.

As the storage units are always ready, waiting times for the pickers can be avoided.

No consolidation of different subsystems necessary, as there is a direct connection from the ESS pick location to the ZSS pick stations or order consolidation buffer.

When a picking order is being processed, there are not several left-over containers from individual subsystems, but only one left-over container per order from the integrated system, such that transport costs for the completed picked order can be reduced.

Integrated Order Consolidation Buffer

The handling of fully picked outbound units is possible without stock transfers via the handling equipment network. The storage and retrieval machines can be used flexibly for the replenishment of items to be picked and for order consolidation.

Shortening of the pick distances for order pickers, as slow movers are presented dynamically.

Space savings for the entire installation, as higher density of the system attainable through an integrated installation.

Savings in operating/system support, as only one single integrated system.

Significant reduction in the connecting handling equipment.

In the present invention, the term handling equipment refers to all apparatus that can be used to move storage units and/or outbound units in the installation. For example, these can be belt conveyors, roller conveyors, transfer carriages, in particular horizontal transfer carriages, vertical conveyors, carousel lifts and the like as well as robots or other vehicles. Accordingly, the term handling equipment in the sense of the invention must be interpreted broadly.

BRIEF DESCRIPTION OF THE FIGURES

The attached drawings show in
FIG. 1 an overview of an embodiment of an inventive installation in plan view,
FIG. 2 an enlarged detailed view of part of FIG. 1,
FIG. 3 a flow chart of the operating procedure for operating the installation from FIG. 1
FIG. 4 a detailed side view of part of a further embodiment of the inventive installation,
FIG. 5 a detailed sectional view of part of a further embodiment of the inventive installation,
FIG. 6 a detailed view of part of the installation from FIG. 1,
FIG. 7 a detailed side view of part of a pick area of an inventive installation and in
FIG. 8 in drawings a) to c) a plan view of the installation from FIG. 1 showing different types of utilisation of the pick areas.

EMBODIMENTS

Further advantages, characteristics and features of the invention result from the following description of embodiments using the attached figures. However, the invention is not limited to these embodiments.

Figure 1:
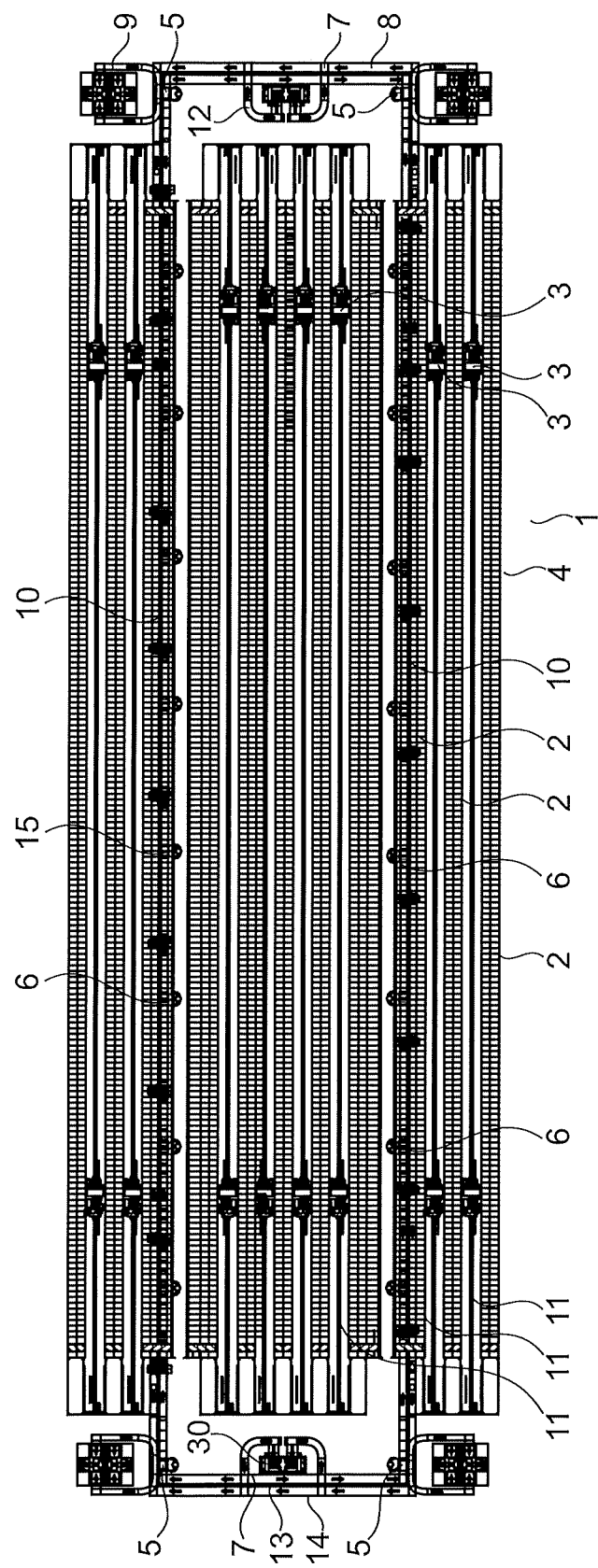

FIG. 1 shows an inventive installation 1 with a small parts store 4 having a plurality of racks 2, in which storage units and outbound units can be stored, and storage and retrieval machines 3, which are disposed in rack aisles 11 between the racks 2, in order to store and/or retrieve storage units and/or outbound units into/from the storage compartments of the SPS 4. The racks 2 each have at least two storage places one behind the other in the direction of the depth of the rack 2 and thus transverse to the rack aisle 11, wherein of course along the rack aisles 11 a multiplicity of storage locations is disposed above and next to each other in each rack 2. The storage and retrieval machines 3 are configured in such a way, that they can serve not only the two storage locations of a rack 2 that are disposed one behind the other in the depth direction, but at least partially can also serve the storage locations of an adjacent rack, such that storage units can be transported from a rack aisle 11 to an adjacent rack aisle 11 through the storage compartments of the adjacent racks 2, which function as a transfer channel. Alternatively, it is also possible to provide racks having only one storage location in the depth direction or only one rack between two rack aisles having a corresponding number of storage locations in the depth direction, such that the general function, namely that storage locations of two adjacent rack aisles can be served by one storage and retrieval machine, is fulfilled.

In the case of the rack aisles 11, a distinction can be made between rack aisles 11, in which storage and retrieval machines 3 move along between the racks 2 in order to store storage units and/or outbound units in the storage locations of the adjacent racks 2 and/or retrieve them, and such rack aisles 11, along which no storage and retrieval machines 3 move, but instead provision is made for pick areas 6 for ZSS picking.

Installation 1 also comprises several stationary pick locations 5 for ESS picking, in which storage units can be retrieved from the small parts store 4 via storage and retrieval machines 3 and be presented at the pick locations 5 via suitable storage unit handling equipment 9 in order that items may be transferred there from the storage units into an outbound unit which is delivered via a conveyor track 8 for outbound units.

In FIG. 1, four pick locations 5 are disposed at the end faces of the racks 2 of the SPS 4. Of course, it is possible in other designs for more or fewer pick locations 5 to be provided. In addition, it is also possible for the pick locations 5 to be disposed in different levels of the installation, as can be seen, e.g., in the embodiment of FIG. 4. Furthermore, it is also possible for the pick locations 5 to be disposed in other areas in and around the SPS 4, whereby, however, disposal at the end faces of the racks 2 is preferred, as this allows the storage unit handling equipment 9 to have a very compact design and simplifies the disposal of the pick areas 6 for ZSS picking.

The conveyor track 8 for the purpose of delivering outbound units into which order picking is to take place has two parallel transport tracks 13, 14 along the end faces of the racks 2 of the SPS 4, such that outbound units can be directly exchanged between the adjacent pick locations 5 at one end face of the SPS 4 via the transport tracks 13,14. FIG. 1 shows the parallel transport tracks 13 and 14 side by side, but the parallel transport tracks 13 and 14 can also be disposed one above the other and connected by vertical conveyors.

In addition, provision is made at transport track 13 of conveyor track 8 for a storage and/or retrieval point 7 for outbound units, where outbound units can be stored in the SPS 4 for the purpose of interim storage or buffering. Accordingly, the storage and/or retrieval point 7 has transfer locations for transferring the outbound units to the storage and retrieval machines 3 in the assigned rack aisles 11. The transfer locations for the storage and retrieval machines 3 can, in the case of storage and retrieval point 7, be located in the same level as the transport track 13 of conveyor line 8, or in one or more levels above or below. For the transport of the outbound units from the transport track 13 to the transfer locations of the storage and/or retrieval point 7, the latter has corresponding interim storage handling equipment 12.

The conveyor track 8 also has several rack tracks 10 which extend along the lower area of the racks 2 disposed in certain rack aisles 11 and from one end face to the other of the racks 2 or the SPS 4. Two adjacent rack tracks 10 each have opposing conveying directions and form a transport loop 15 with the respective transport tracks 13 along the end faces of the racks 2, whereby only one transport loop 15 can be seen in the installation 1 shown in FIG. 1. Of course, it is also possible for more transport loops 15 to be formed, whereby the transport loops 15 can also be disposed one above the other in different levels.

Along the rack tracks 10 in the corresponding rack aisles 11, installation 1 has so-called pick stations 6 or pick areas, which comprise a plurality of pickup points 17 for storage units (see FIG. 5), from which the pickers 18 can remove the items to be picked and sort them into outbound units, which are delivered to the pick stations 6, as per ZSS picking. As will be described in detail below with reference to FIG. 5, dynamic and static pickup points 17 for storage units are provided at the pick stations 6, a fact which means that, at static pickup points 17, frequently required items are presented constantly (static), while at dynamic pickup points 17 only those items are presented as are required, such that there the storage units in the pickup points are frequently changed (dynamic) by the storage and retrieval machines 3 and various items can be presented as required. The dynamic and static pickup points 17 can be provided at an individual or at every pick area or pick station 6. However, it is also possible for pick stations 6 to be provided, at which only dynamic pickup points 17 are disposed or only static pickup points 17.

As can be seen from FIG. 1, the various pick stations 6 along a rack 2 on a rack aisle are connected to each other via a rack track 10, such that one outbound unit can be transported from one pick station 6 to the other. At the end faces of the racks, the corresponding rack tracks 10 for the outbound units along the racks are cross-connected via transport tracks 13 and 14 with one another within a transport loop 15 or between several transport loops 15, such that an outbound unit can be transported to every pick station 6. At the same time, the conveyor track 8 with its various handling equipment subcomponents also facilitates integration of the pick locations 5 for ESS picking, such that an outbound unit can be picked both in the pick areas 6 and the pick locations 5 and/or can be stored in and/or retrieved from the SPS 4 via the interim storage handling 12 and the storage and/or retrieval points 7, such that, e.g., partially or fully picked outbound units can be temporarily stored in order that order consolidation may be carried out within the SPS 4.

Figure 2:
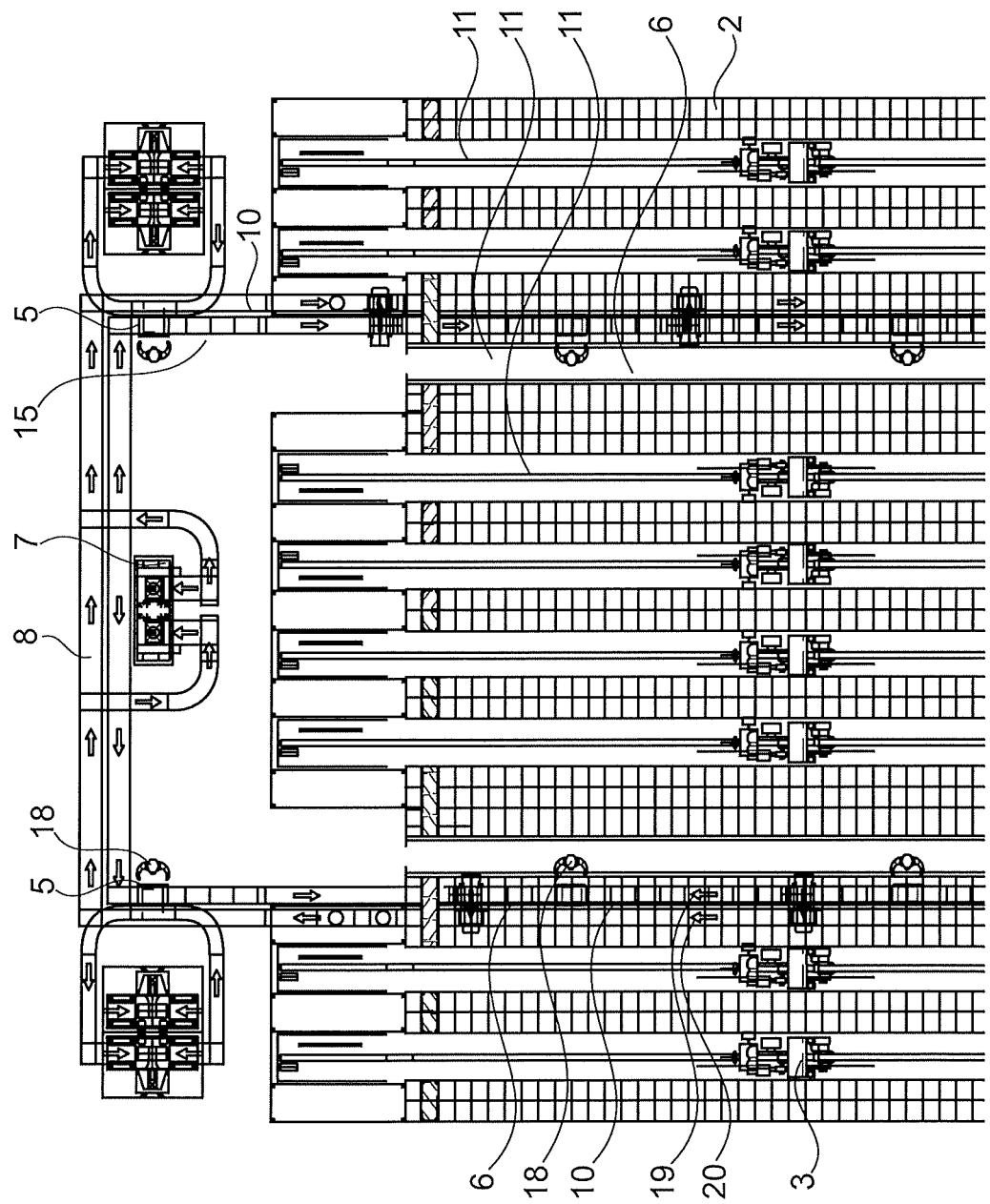

FIG. 2 shows a section of installation 1 from FIG. 1 in greater detail. In particular, it can be seen here that the rack tracks 10 are each made up of two parallel sub-tracks 19 and 20, which run parallel with each other in the lower area of a rack 2. Sub-track 19 serves to move the outbound unit to be picked within the respective pick area 6, while sub-track 20 serves to transport the outbound units from one pick area 6 to the other or to transport the outbound units along conveyor track 8. Conveyor track 8 thus forms a peripheral loop track, in particular with sub-tracks 19 and 20, such that the various areas of the installation are connected to each other via the loop track.

The outbound units can be moved automatically on sub-track 20 in the same way as on sub-track 19, e.g. by a driven roller conveyor, or the outbound units can be moved manually on the sub-track 19 by a picker 18 along the pickup points 17.

In addition, FIG. 2 shows the same components as FIG. 1, such that no further explanation of the corresponding components is required.

Figure 3:
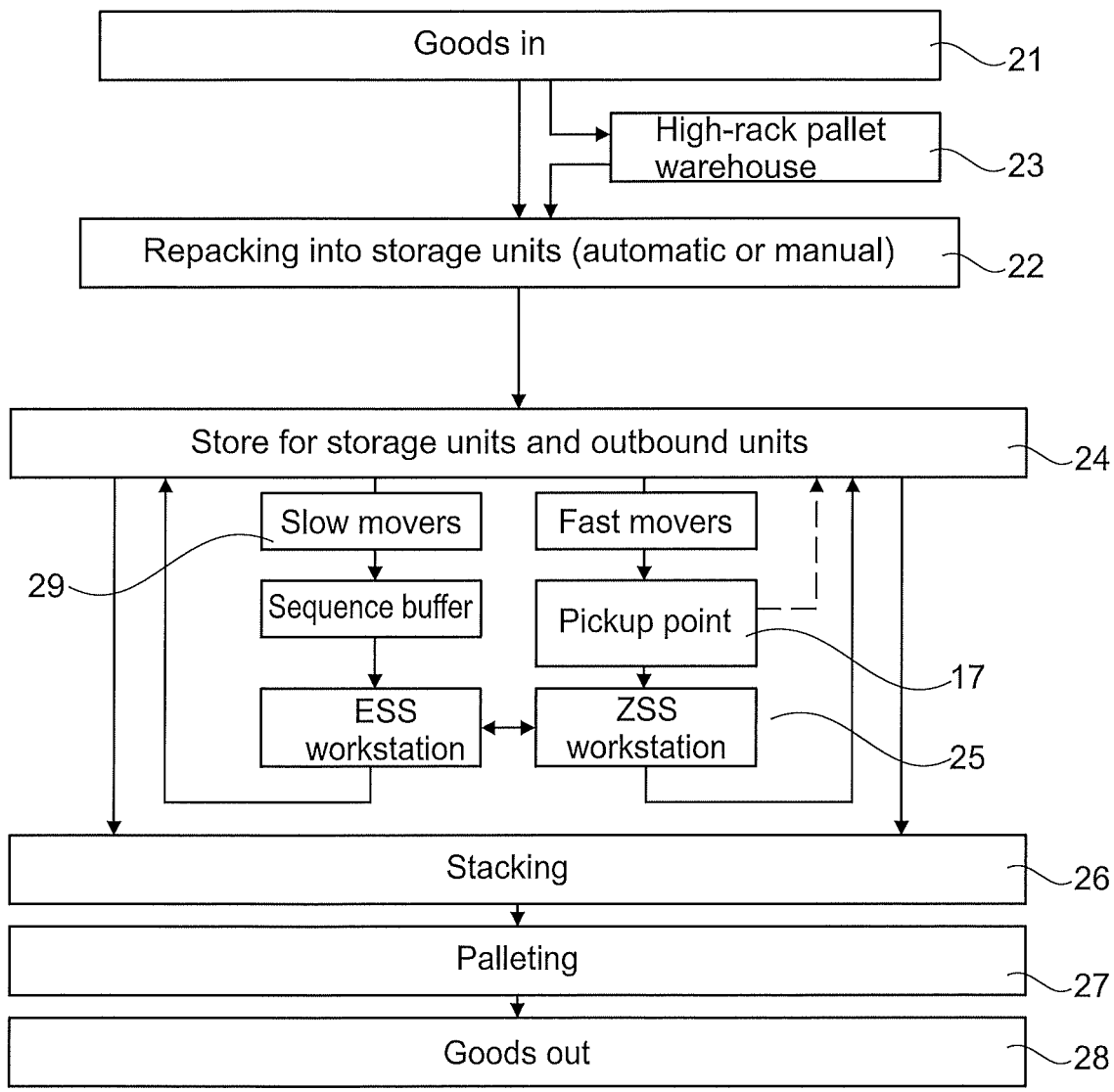

FIG. 3 is a flow chart showing the different steps entailed in the picking of items according to the operating sequence of installation 1 in FIGS. 1 and 2.

First, in step 21, items are delivered which, in step 22, are repacked automatically or manually at repacking locations, not shown in any further detail, into corresponding storage units, unless the containers with which the items are delivered can be used directly as storage units. Instead of the delivered items being repacked directly into storage units, the delivered stacks of items can also be temporarily stored in a pallet warehouse. After repacking in step 22, in step 24 the items which are now in the storage units are stored into the automated small parts store 4 (SPS) or into the racks 2 thereof, for which purpose storage and retrieval machines 3 and warehouse handling equipment are used, which, for example, can be achieved at least partially by conveyor track 8 and/or by a separate handling technology, which is not explicitly shown in the figures.

For the purpose of picking, in step 25, the storage units and the items accommodated therein are retrieved from the SPS 4 and conveyed via the storage and retrieval machines 3 either to the pickup points 17 of the pick areas 6 or via the storage unit handling equipment 9 to the pick locations 5. As will be shown later, a sequence buffer 29 can be provided in storage unit handling equipment 9 to ensure that the required storage units containing the corresponding items can be presented in time at pick locations 5.

Then, in step 25, picking takes place into the corresponding outbound units, more precisely either in pick areas 6 and/or pick locations 5, wherein "slow-movers", i.e. items that do not have to be picked frequently, can be picked via the ESS system, while "fast-movers", which are picked frequently, can be picked via the ZSS system. However, as mentioned above, flexible deployment of the picking system systems is possible.

Partially picked outbound units or already fully picked outbound units can be stored in the SPS 4 for the purpose of interim storage or order consolidation until further picking is possible in the corresponding pick areas 6 and/or pick locations 5 or the other outbound units of a shipping unit are fully picked, such that all outbound units of a shipping unit can be transferred to a stacking and/or packing station where they can be stacked 26 and/or packed 27. The actual goods-out process takes place in step 28. FIGS. 4 to 9 show details of the installation 1 and further embodiments of various components of the combined ESS and ZSS picking systems.

Figure 4:
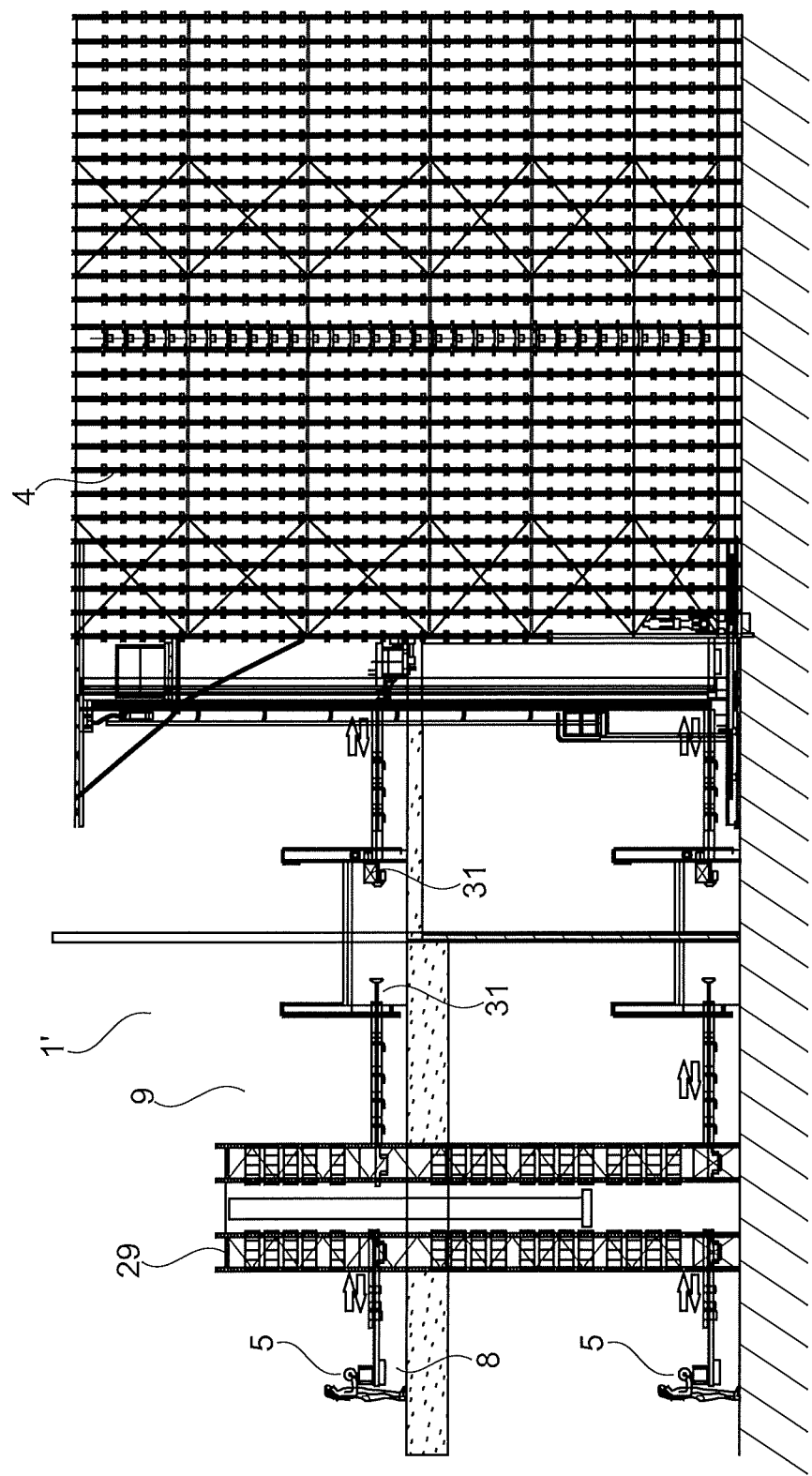

FIG. 4 shows, for example, how the interaction between an ESS pick location 5 and the automated small parts store 4 can be configured using storage unit handling equipment 9 and a buffer device 29 (sequence buffer).

FIG. 4 is a side cross-sectional view of part of an embodiment of an inventive installation 1' comprising an SPS 4 and two pick locations 5 for ESS picking in two different levels of the installation 1'. The pick locations 5 are connected to the SPS 4 via the storage unit handling equipment 9, such that storage units can be transported from the SPS 4 to the pick locations 5.

The storage unit handling equipment 9 comprises a sequence buffer 29, e.g. in the form of a vertical carousel lift in which the storage units can be stored, such that punctual delivery can be ensured at order pick locations 5 in accordance with the predetermined picking sequence. Due to its configuration as a vertical carousel lift, the sequence buffer 29 can serve simultaneously as a sequence buffer for the two pick locations 5 in the various levels.

In addition, the storage unit handling equipment 9 comprises a storage and retrieval machine 30 for transporting storage units vertically from different levels of the SPS 4 in the direction of the ESS pick locations 5. In addition, provision is made in the storage unit handling equipment 9 for horizontal conveyors 31, which enable the storage units to be transported perpendicularly to the image plane between the individual rack aisles. This makes it possible to transport any storage unit from any storage compartment or rack compartment of the SPS 4 to any pick location 5 or pick area 6.

Figure 5:
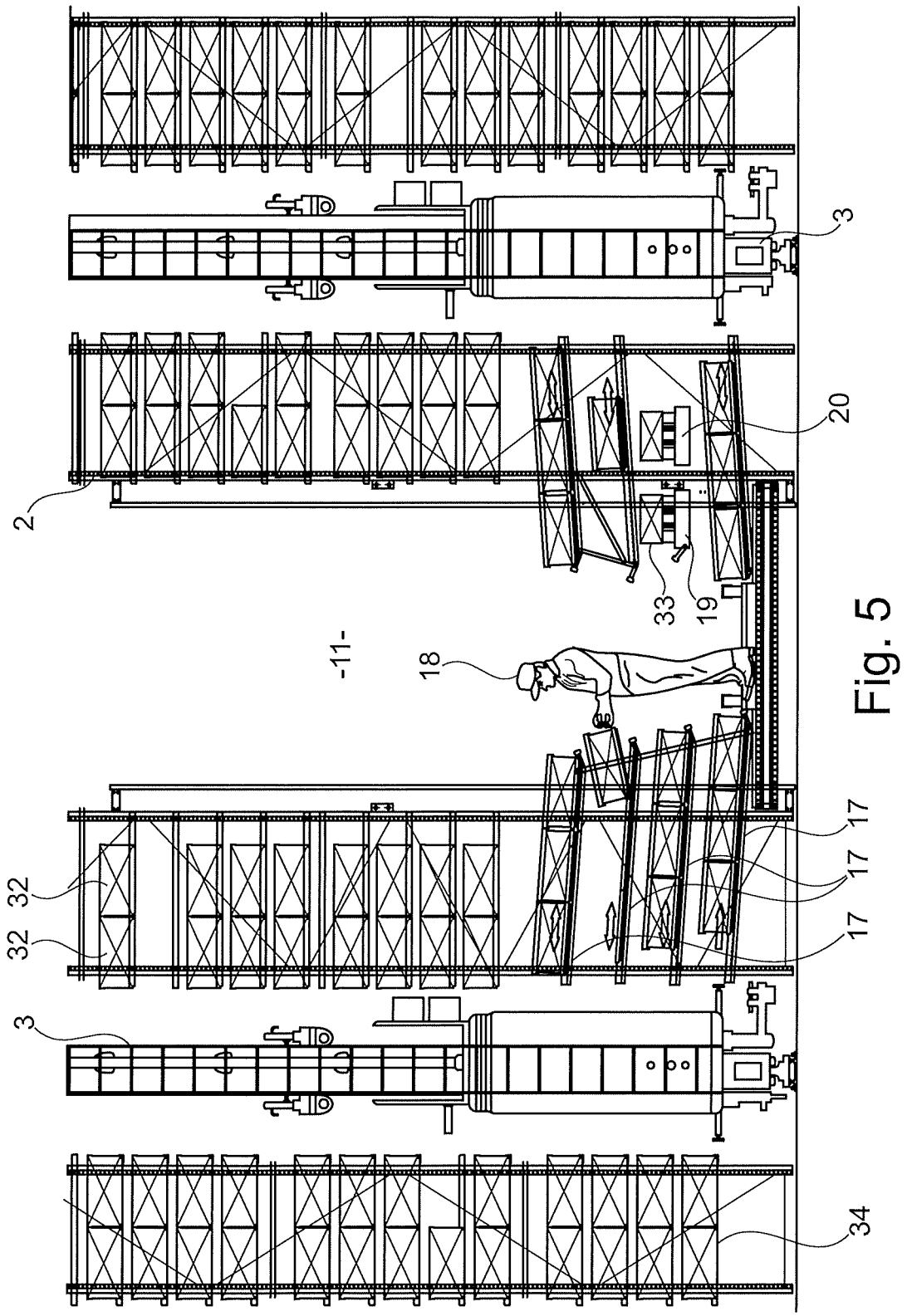

FIG. 5 shows a cross-section through a pick area 6 or pick station with the presentation of the storage units 32 in pickup points 17 in the lower area of two racks 2 enclosing a rack aisle 11. The presentation of storage units 32 containing the items to be picked in the pickup points 17 for ZSS picking can take place both at static pickup points and at dynamic pickup points 17. In the case of static pickup points 17, the same items are always kept available in the corresponding pickup points 17, i.e. throughout the entire picking process, so that the respective storage and retrieval machine 3 always pushes the storage units containing the same items from the rear of the corresponding rack 2 opposite the removal side into the pickup point 17. In the case of dynamic pickup points 17, the type of item held in the storage units in the corresponding pickup point changes, such that the storage and retrieval machine 3 delivers the correspondingly different types of item to the same pickup point 17 as required and, if the storage unit with the items remaining in it is no longer needed, returns it to a rack compartment 34 of the SPS 4.

FIG. 5 also shows that the outbound units 33 on the sub-tracks 19 and 20 of the rack track 10 of the conveyor track 8 are transported along the racks 2, whereby the picker 18 transfers the corresponding items from the storage units 32 presented at the pickup points 17 into the outbound unit transported on the sub-track 19, while the outbound unit 33 transported on the sub-track 20 is transported past the pick station 6 shown.

Figure 6:
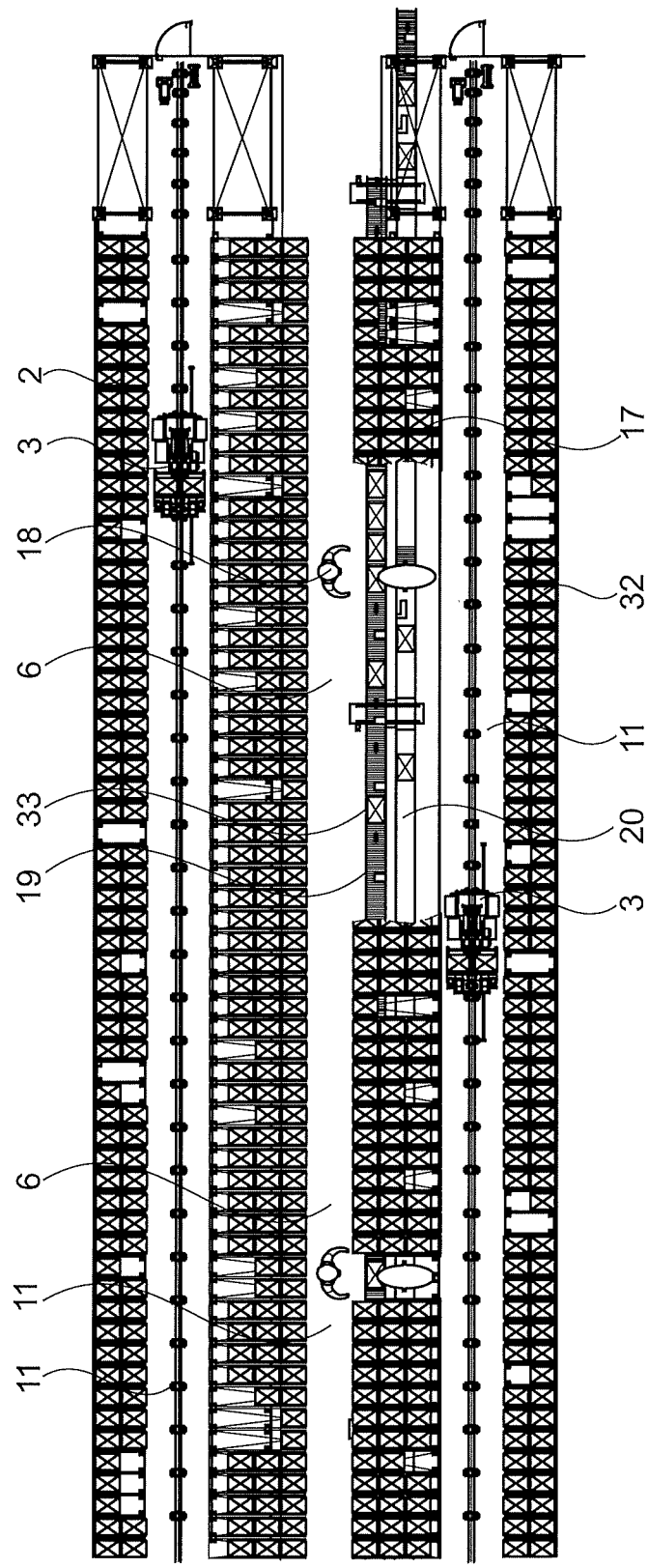

FIG. 6 shows a horizontal cross-section and a plan view of pick areas 6 of an inventive installation, one of which is shown in cross-section in FIG. 5. As can already be seen in FIG. 5, in a lower area of the racks 2 along rack aisle 11, along which run the sub-tracks 19 and 20 of rack track 10, are provided pickup points 17 which are supplied with items via the storage and retrieval machines 3, which contain storage units from the rack compartments 34 of the SPS 4 and which are movably disposed in adjacent rack aisles 11. In the pick areas 6, pickers 18 ensure that the items from the storage units 32 in the pickup points 17 are transferred into the outbound units 33.

Figure 7:
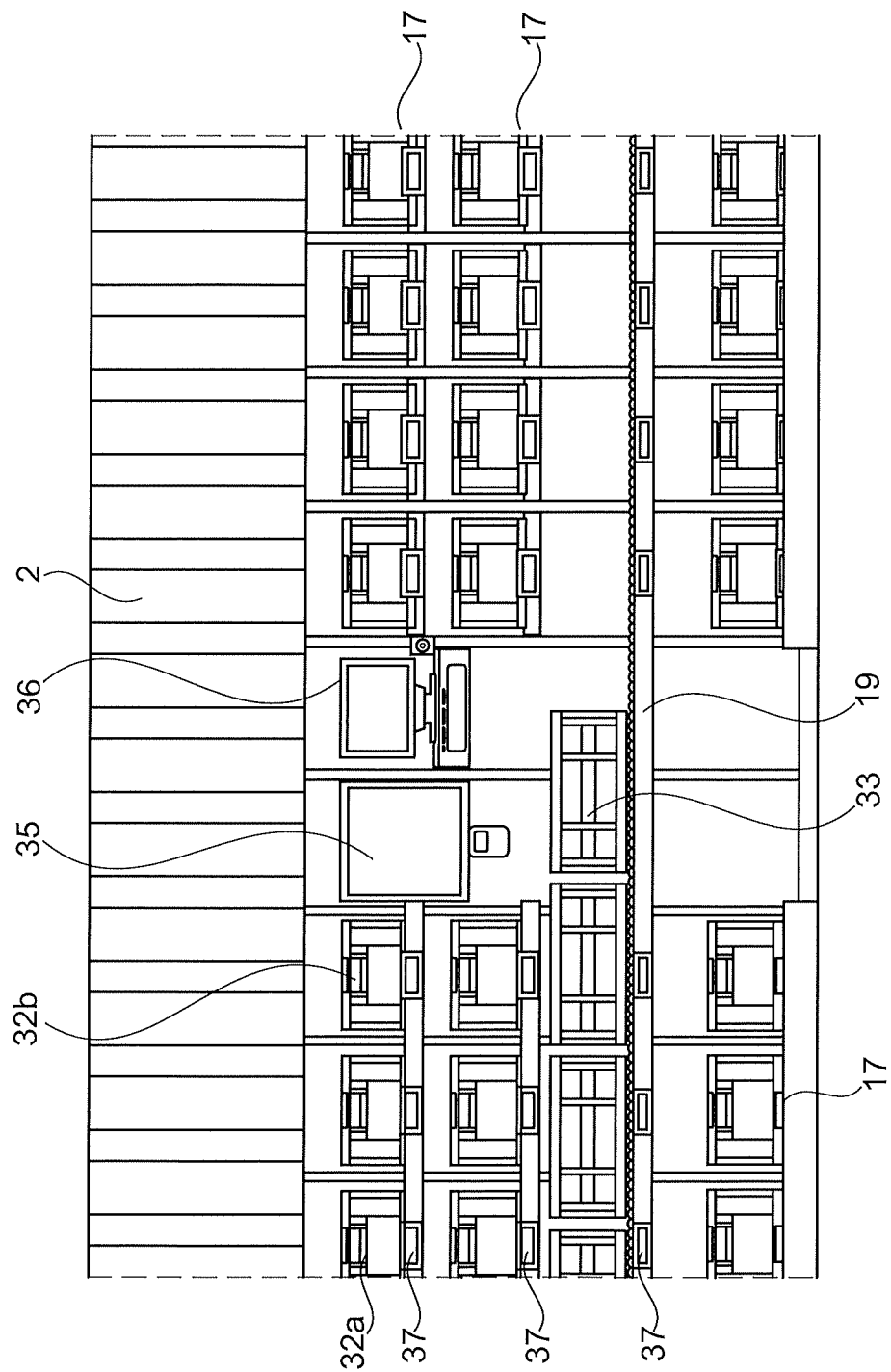

For this purpose, several aids such as a display 35 and/or the screen 36 of a workstation are disposed in the pick areas 6 which indicate to the picker 18 how many items he should transfer from a given storage unit to a given outbound unit (see FIG. 7). To this end, corresponding coloured light bars 37 can also be disposed at the pickup points 17, which colour-code the corresponding pickup points 17, from which corresponding items need to be removed for the next outbound unit 33. For example, for the next outbound unit 33, the display 35 can show the number of items to be removed from the storage unit 32a, whose pickup point 17 has been switched to green by the light bar display. The green colour makes it easier for the picker to find the relevant pickup point 17 containing the storage unit 32a waiting there and from which items must be removed. Accordingly, a different colour can be selected for a later outbound unit or the next items to be picked, e.g. the colour red, which indicates that, for the next outbound unit or for the next items to be picked, the items must be removed from the storage unit 32b in the corresponding pickup point 17, which are marked in red by the light bar display. Alternatively, several pickup points 17 can also be marked simultaneously with a colour to indicate to the order picker that items must be transferred from these pickup points 17 into the outbound unit 33. Thus, the light bar display 37 can be used in different ways to either indicate a specific pickup point 17 for a picking operation or to mark several pick locations 17 from which different items for an outbound unit 33 have to be removed.

Figure 8:
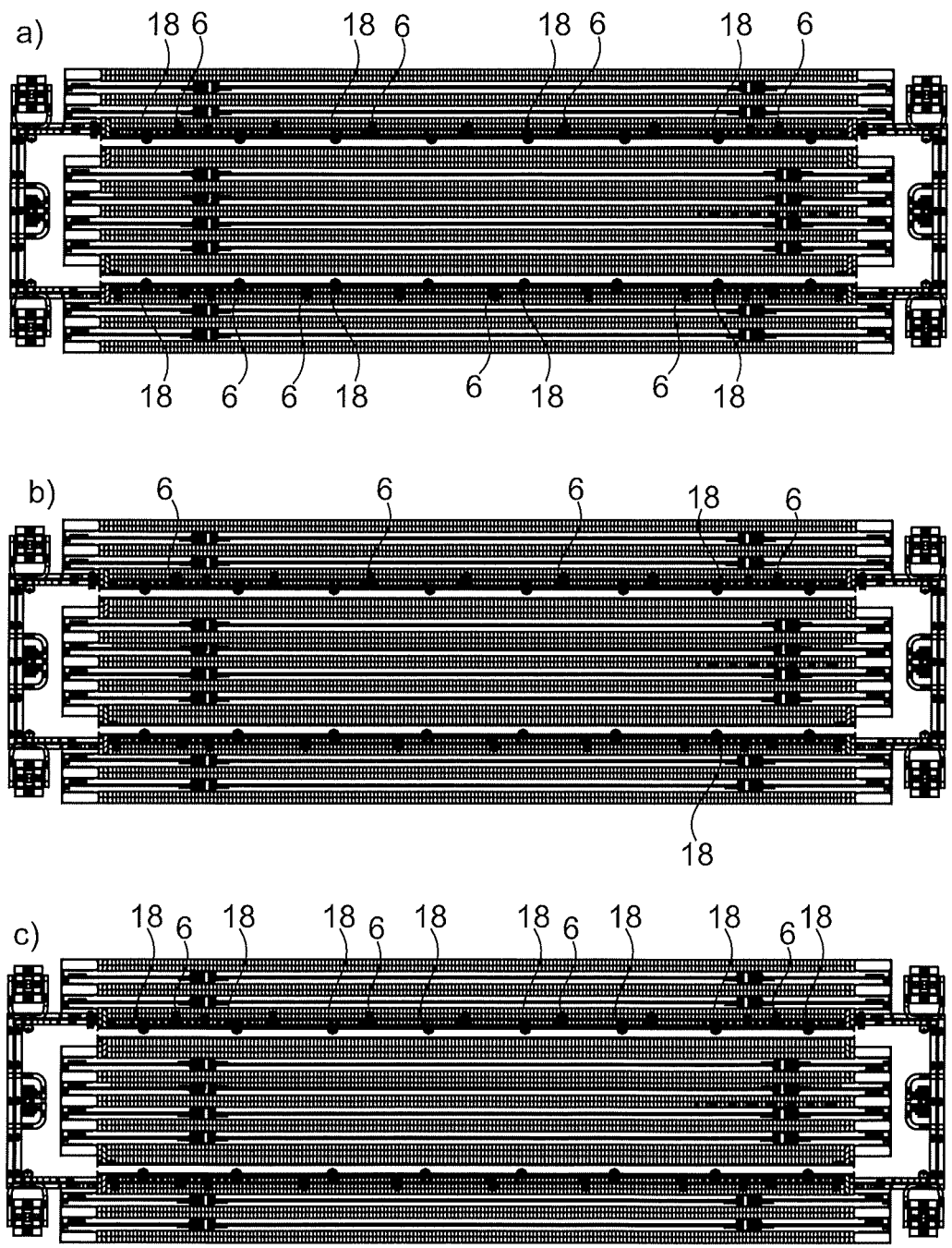

FIG. 8 shows that the pick areas 6 or pick stations can be used variably. In FIGS. 8a), 8b) and 8c), the pick areas 6 of installation 1 from FIGS. 1 and 2 with different utilisation of the various pick areas 6 are represented by a different number of pickers 18. In FIG. 8a), a picker 18 is assigned to each pick area 6, while in FIG. 8b), a picker 18 is responsible for several pick areas 6 and in Figure c), several pickers 18 are active in one pick area 6. This makes it clear that the pick areas 6 or pick stations can be used variably with a different number of pickers 18.

With the inventive installation and the method for picking items, in which two different types of picking are achieved in a compact way in combination with an automated small parts store, it is possible to respond flexibly to different picking requirements. In particular, various items that are picked frequently and are known as fast-movers can be picked flexibly with the "ZSS picking system" and a plurality of items that have to be picked less frequently can be picked with the "ESS system", whereby the individual items can be moved flexibly from one system to another.

LIST OF REFERENCE NUMERALS

1 Installation
2 Rack
3 Storage and retrieval machine
4 Small parts store (SPS)
5 Pick location (ESS)
6 Pick area (pick station) (ZSS)
7 Storage/retrieval point
8 Conveyor track
9 Storage unit handling equipment
10 Rack track
11 Rack aisle
12 Interim storage handling equipment
13 Transport track
14 Transport track
15 Transport loop
16 Pickup point
17 Picker
18 Sub-track
10 Sub-track
20 Goods in
21 Repacking
22 Interim storage in the pallet warehouse
23 Storage in SPS
24 Picking
25 Stacking
26 Packing of the outbound units
27 Goods out
28 Sequence buffer
29 Storage and retrieval machine
30 Horizontal conveyor
31 Storage unit
32a Storage unit
32b Storage unit
33 Outbound unit
34 Rack compartment
35 Display
36 Screen
37 Colour light bar

The invention claimed is:

1. An installation for picking items from storage units into one or more outbound units for the purpose of composing a shipping unit, wherein the installation comprises
   a small parts store, in which the storage units are stored,
   at least one pick area, in which storage units from the small parts store are presented at several pickup points for the purpose of removing items from the storage units,
   a conveyor track, assigned to the at least one pick area, via which the outbound units can be moved in or out of the at least one pick area, such that items can be picked from the storage units disposed in the pickup points into the outbound units,
   at least one pick location, at which are disposed one or more receiving locations for outbound units,
   a conveyor device, disposed at the at least one pick location, for storage units from the small parts store, such that items can be picked from the storage units delivered on the conveyor device into the outbound units disposed at the receiving locations, and an interim storage handling equipment, comprised in the small parts store, for storing and/or retrieving partially or fully picked outbound units into/from the small parts store, said handling equipment being connected to the conveyor track, such that outbound units from the at least one pick area and/or the at least one pick location can be stored in the small parts store or, conversely, retrieved from it.

2. The installation of claim 1, wherein the at least one pick area and the at least one pick location are connected via the conveyor track, such that outbound units can be automatically transported from the at least one pick area to a pick location and/or vice versa.

3. The installation of claim 1, wherein the installation further comprises vertical handling equipment for interconnecting components from the group comprising pick areas, pick locations and interim storage handling equipment, at different levels.

4. The installation of claim 1, wherein the installation further comprises storage handling equipment, with which storage units can be stored in the small parts store.

5. The installation of claim 4, wherein the storage handling equipment comprises shared components with the interim storage handling equipment, and/or the installation has a takeway conveyor, with which outbound units can be transported to a stacking and/or packing station.

6. The installation of claim 5, wherein the takeaway conveyor is connected to the conveyor track and/or at least one retrieval point of the small parts store.

7. The installation of claim 1, wherein the small parts store is a rack store, which comprises several rack rows and rack aisles, which are each disposed along a rack row, wherein, in at least one rack aisle, at least one retrieval machine is disposed per rack aisle for the purpose of storage and retrieval of storage units and outbound units.

8. The installation of claim 7, wherein the small parts store comprises transfer channels for transferring storage and/or outbound units from one rack aisle to another rack aisle and/or comprises storage and retrieval machines which can access the same storage locations from different rack aisles.

9. The installation of claim 1, wherein the pickup points of the at least one pick area are disposed in the small parts store and are loaded with storage units from one or more storage and retrieval units of the small parts store.

10. The installation of claim 1, wherein the pickup points are stationary and the conveyor track is configured such that it can move outbound units past the pickup points.

11. The installation of claim 1, wherein the at least one pick location is connected to the small parts store via storage unit handling equipment, a sequence buffer for sequential presentation of storage units being disposed between small parts store and pick location.

12. The installation of claim 7, wherein the pick locations are disposed at the end faces of the racks.

13. A method for picking items, wherein the method comprises:
providing an installation in accordance with claim 1, wherein items in a small parts store are stored in storage units and, for the purpose of composing a shipping unit, are transferred into one or more outbound units of the shipping unit,
presenting the storage units automatically from the small parts store at pickup points,
transferring items from the storage units presented at the pickup points into the one or more outbound units disposed on a conveyor track,
transferring items at at least one pick location from storage units from the small parts store into the one or more outbound units,
at the pick location, automatically transferring the storage units on a conveyor device to the pick location, such that items from the various storage units transported to the pick location can be transferred into an outbound unit presented at the pick location, and
placing one or more outbound units in interim storage in the small parts store between individual picking steps and/or until an entire shipping unit has been completed.

14. The method of claim 13, wherein the small parts store comprises a plurality of storage locations, the small parts store being used for storing not only storage units but also outbound units.

15. The method of claim 14, wherein a plurality of storage locations can be used not only for storage of storage units but also for interim storage of outbound units.

16. The method of claim 13, wherein the one or more outbound units can be picked not only at the pick location but also in the pick area.

17. The method of claim 13, wherein specific items are always presented in a pickup point and/or other items are presented only as required.

18. The method of claim 13, wherein at the pick location the items in different storage units are presented in a predetermined sequence.

19. The method of claim 13, wherein a storage unit containing specific items can be presented at a pickup point and/or a pick location, such that the type of picking for the specific item can be switched.

20. The method of claim 13, wherein to an extent depending on a pick load, picking tasks can be distributed between the pick areas and pick locations and/or between several pick areas or pick locations, preference being given to parameters from the group of actual and/or expected average picking speed per order, frequency of required movements of storage units and/or outbound units, picking frequency of a particular item, determined pick rate of pickers and number of pickers required.

* * * * *